Jan. 6, 1970  N. H. HACKETT  3,487,641
HYDRAULIC BRAKE MASTER CYLINDER ASSEMBLY
Filed Oct. 9, 1967
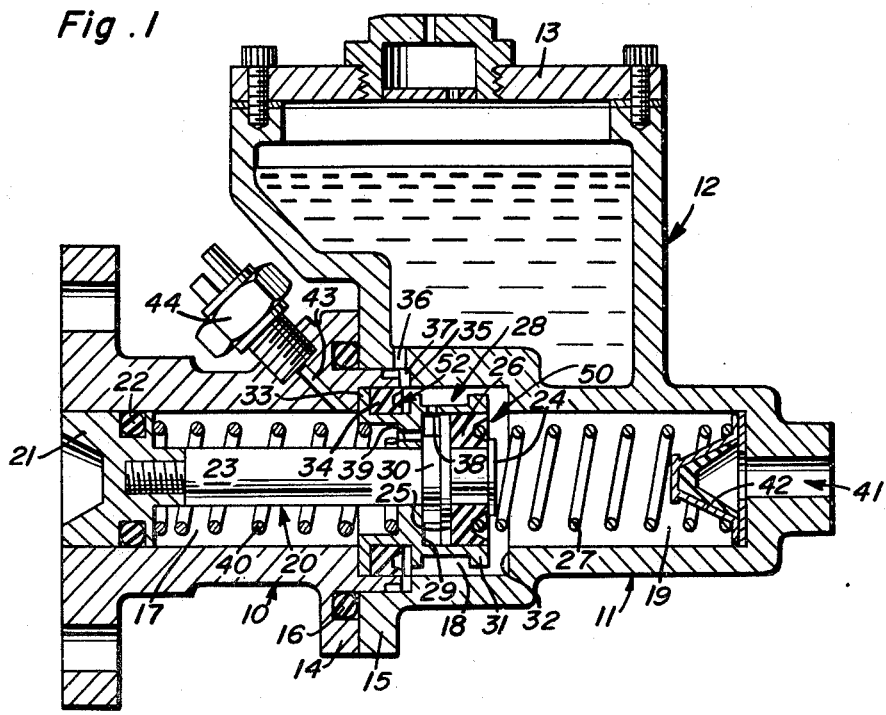
Norman H. Hackett
INVENTOR.

United States Patent Office 3,487,641
Patented Jan. 6, 1970

3,487,641
HYDRAULIC BRAKE MASTER
CYLINDER ASSEMBLY
Norman H. Hackett, 2 Eastborn Flats, 19 Imperial Ave.,
Bondi, New South Wales, Australia
Filed Oct. 9, 1967, Ser. No. 673,897
Int. Cl. F15b 7/08
U.S. Cl. 60—54.6                               9 Claims

ABSTRACT OF THE DISCLOSURE

A master cylinder assembly for use in an automotive hydraulic brake system which includes first and second pistons spaced apart in and fitting closely in a bore of the assembly and arranged to move together along the bore under pressure applied from a brake pedal, return spring means to return the pistons to an initial position on release of said pressure, a fluid reservoir, means defining a fluid passage between said reservoir and a part of said bore between the pistons. A valve means carried by one of the pistons in such a manner that an initial movement of the pistons causes the valve means to seal the fluid passage. The first piston normally delivers fluid under pressure to a fluid outlet from the bore to operate the wheel cylinders of the brake system and wherein the second piston takes over the function of the first piston on a failure of the first piston taking place, such as to allow leakage of fluid past it in the bore.

The present invention relates to a hydraulic brake master cylinder assembly for use in the hydraulic brake systems of motor vehicles.

The object of the invention is to provide a brake master cylinder assembly in which complete brake failure due to failure of the master cylinder piston is prevented by the provision of an additional piston which automatically takes over the function of the normal piston should this fail allowing leakage of fluid past the piston.

The invention consists in a hydraulic brake master cylinder assembly having a first piston and a second piston spaced apart in and fitting closely in a bore of said assembly arranged to move together along the bore under pressure applied from a brake pedal, return spring means to return said pistons to an initial position on release of said pressure, a fluid reservoir, means defining a fluid passage between said reservoir and a part of said bore between the pistons, valve means operably connected to said pistons in such a manner that an initial movement of the pistons causes the valve means to seal the said fluid passage, said first piston being constructed and arranged on normal operation to deliver fluid under pressure to a fluid outlet from the bore and said second piston being constructed and arranged to take over the function of the first piston on a failure of the first piston taking place such as to allow leakage of fluid past it in the bore.

These together with other objects and advantages which will become subsequently apparent reside in the details of construction and operation as more fully hereinafter described and claimed, reference being had to the accompanying drawings forming a part hereof, wherein like numerals refer to like parts, and in which:

FIG. 1 is a longitudinal vertical sectional view of a master cylinder assembly according to the invention in the normal rest position and FIG. 2 is a similar view showing the assembly in operation.

The master cylinder assembly consists of a rear section 10 and a forward section 11, the latter having formed integrally with it a reservoir 12 having a detachable lid 13. The sections 10 and 11 are secured together by bolts (not shown) passing through flanges 14 and 15, any gap between the meeting faces of these flanges being sealed by the O ring 16.

A bore passes through the assembly and this consists of a rear portion 17, a central portion 18 of enlarged diameter and a forward portion 19. Slidably mounted in the bore is a composite piston assembly 20. This consists of a rear piston 21 in an annular groove in which is the O ring 22. Stem 23 is screwed into the piston 21 and is formed at its forward end with a head 24 and a flange 25 between which is carried an annular generally cylindrical ring 26, preferably having an annular concavity, as at 50, on the forwardly disposed axial face thereof, which constitutes the main piston of the master cylinder and operates in the forward portion 19 of the bore. The ring 26 is held in position by the spring 27 which also acts as a return spring for the piston assembly 20.

An annular member 28 is mounted around the forward end of the stem 23 in the central portion 18 of the bore so as to be slidable therein. An internal flange 29 is normally held in contact with the portion of reduced diameter 30 of the flange 25 by the spring 40 (see FIG. 1).

The annular member 28 has a forward flange 31, the leading axial face of which is generally flat and in operation makes contact with the annular face 32 of the forward section 11 of the assembly. A rear flange 33 of the annular member 28 supports a second ring 34 preferably having a forwardly facing axially disposed annular groove 52. The purpose of this ring 34 is to seal the annular gap 35 thus preventing flow of fluid between the interior of the reservoir via orifice 36 and annular space 37 and the central section 18 of the bore when the assembly is in operation (see FIG. 2). It should be noted that this section is in communication with the interior of the annular member 28 by means of the aperture 38 and that this in turn communicates with the rear section 17 of the bore through the passage 39 in the flange 29.

The passage 41 at the forward end of the assembly is connected either directly or indirectly to the brake cylinders. In the latter case devices for increasing the pressure in the brake lines or isolating front and rear brake systems may be attached to the master cylinder assembly. The outlet from the bore to the passage 41 is provided with a residual pressure valve 42 of conventional construction and this is held in place by the spring 27.

The rear portion 17 of the bore is connected by a passage 43 to a pressure switch 44, which in use is connected to provide a visible or audible indicator when pressure in the rear portion of the bore exceeds a predetermined value.

Pressure from a brake pedal (not shown) is applied to the piston assembly 20 through the rod 45. When pressure is applied to this the whole assembly moves forward to the position shown in FIG. 2. As this occurs the ring 34 seals the gap 35, as explained above, the face of the flange 31 meets the face 32 and the ring 26 passes from the interior of the annular member 28 into he forward portion 19 of the bore.

Under normal operating conditions the ring 26, supported by flange 25, acts as a normal master cylinder piston. If, however, the ring 26 fails, instead of this resulting in complete brake failure, the rear piston 21 takes over its function automatically.

Owing to the presence of the passage 39, fluid by-passing the ring 26 flows into the rear portion 17 of the bore, in which the pressure rises to the operating pressure in the forward portion 19. Owing to the action of the ring 34 in blocking the orifice 36 fluid is prevented from flowing back into the reservoir 12 thus permitting the rear piston 21 to take over the function of the now defunct main or primary piston.

In order to warn the user of the vehicle that a partial failure of the master cylinder assembly has taken place the pressure switch 44 is provided, which may be wired in circuit with a warning light.

When pressure on the brake pedal is released the piston assembly returns to the position shown in FIG. 1 under the influence of the springs 27 and 40 and communication between the bore and the reservoir is restored through the orifice 36.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention. For example the valve means to seal the fluid passage or orifice 36 may be a part of one or other of the pistons.

What is claimed as new is as follows:

1. A hydraulic brake master cylinder assembly having a first piston and a second piston spaced apart in and fitting closely in a bore of said assembly arranged to move together along the bore under pressure applied from a brake pedal, return spring means to return said pistons to an initial position on release of said pressure, a fluid reservoir, means defining a fluid passage between said reservoir and a part of said bore between the pistons, valve means operably connected to said pistons in such a manner that an initial movement of the pistons causes the valve means to seal the said fluid passage, said first piston being constructed and arranged on normal operation to deliver fluid under pressure to a fluid outlet from the bore, said second piston being constructed and arranged to take over the function of the first piston on a failure of the first piston taking place such as to allow leakage of fluid past it in the bore, a stem connecting the first and second pistons and said valve means being carried by an annular member slidable on said stem.

2. A hydraulic brake master cylinder assembly having a first piston and a second piston spaced apart in and fitting closely in a bore of said assembly arranged to move together along the bore under pressure applied from a brake pedal, return spring means to return said pistons to an initial position on release of said pressure, a fluid reservoir, means defining a fluid passage between said reservoir and a part of said bore between the pistons, valve means operably connected to said pistons in such a manner that an initial movement of the pistons causes the valve means to seal the said fluid passage, said first piston being constructed and arranged on normal operation to deliver fluid under pressure to a fluid outlet from the bore, said second piston being constructed and arranged to take over the function of the first piston on a failure of the first piston taking place such as to allow leakage of fluid past it in the bore, said bore consisting of a rear portion in which said second piston moves, a forward portion in which said first piston moves and a central portion of greater diameter connecting the rear portion and the forward portion, a stem connecting the first and second pistons, an annular member arranged in said central portion to be slidable on said stem, the said valve means being mounted on the annular member and spring means being provided to urge the annular member away from the second piston towards the first.

3. The combination of claim 2 wherein the said valve means is a generally non-circular cross-sectional ring having a forwardly facing axially disposed annular groove and supported on an external flange on said annular member and fits closely within the central portion of the bore.

4. The combination of claim 3 wherein said annular member is provided at its forward end with an annular face and a corresponding internal shoulder is provided at the junction of the central and forward portions of the bore, said face being spaced from said shoulder when the assembly is in the initial position and being moved into contact therewith during said initial movement by force transmitted through said spring means, the first piston lying within the annular member during initial movement and thereafter entering the forward portion of the bore.

5. The combination of claim 2 wherein a pressure responsive electrical switch is placed in fluid connection with the rear portion of the bore for connection in circuit with a warning means whereby on pressure in the rear portion exceeding a predetermined value a warning indication is given.

6. The combination of claim 2 wherein the fluid outlet is at the forward end of the forward portion of the bore, said outlet being provided with a residual pressure valve held in position by a coil spring extending between the first piston and the residual pressure valve.

7. The combination of claim 3 wherein the fluid outlet is at the forward end of the forward portion of the bore, said outlet being provided with a residual pressure valve held in position by a coil spring extending between the first piston and the residual pressure valve.

8. The combination of claim 4 wherein the fluid outlet is at the forward end of the forward portion of the bore, said outlet being provided with a residual pressure valve held in position by a coil spring extending between the first piston and the residual pressure valve.

9. The combination of claim 5 wherein the fluid outlet is at the forward end of the forward portion of the bore, said outlet being provided with a residual pressure valve held in position by a coil spring extending between the first piston and the residual pressure valve.

References Cited

UNITED STATES PATENTS

| | | | |
|---|---|---|---|
| 2,114,992 | 4/1938 | Bowen | 60—54.6 |
| 2,347,239 | 4/1944 | Berno | 60—54.6 XR |
| 2,525,740 | 10/1950 | Trevaskis | 60—54.6 |

MARTIN P. SCHWADRON, Primary Examiner

R. R. BUNEVICH, Assistant Examiner